(No Model.)
C. LEDUC.
LIFE PRESERVER.
No. 315,950. Patented Apr. 14, 1885.
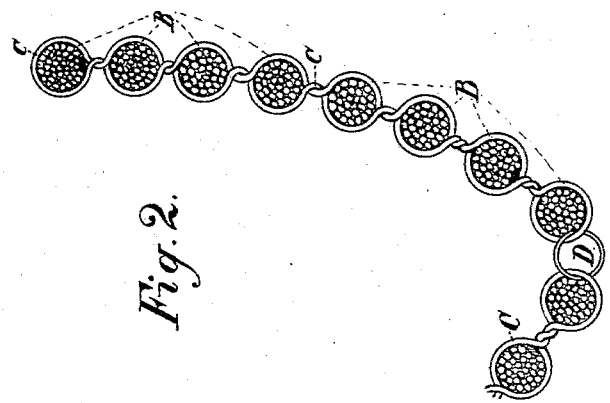
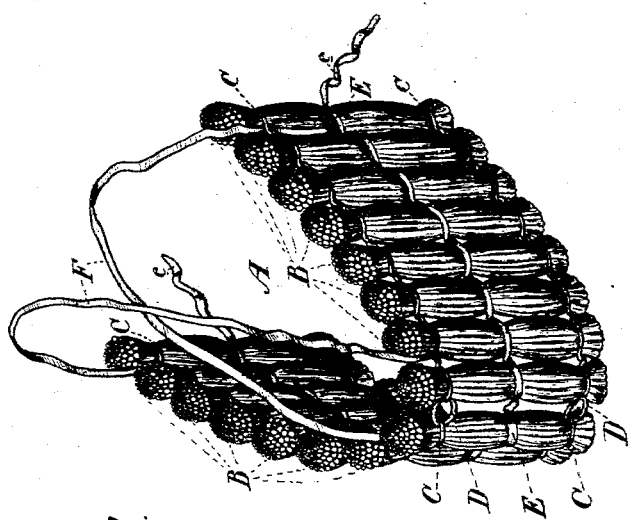
Witnesses,
Geo. H. Strong
J. A. Nourse
Inventor,
C. Leduc
By Dewey & Co.
Attorneys

UNITED STATES PATENT OFFICE.

CONSTANT LEDUC, OF SAN FRANCISCO, CALIFORNIA.

LIFE-PRESERVER.

SPECIFICATION forming part of Letters Patent No. 315,950, dated April 14, 1885.

Application filed August 7, 1884. (No model.)

*To all whom it may concern:*

Be it known that I, CONSTANT LEDUC, of the city and county of San Francisco, and State of California, have invented an Improvement in Life-Preservers; and I hereby declare the following to be a full, clear, and exact description thereof.

My invention relates to a new and useful life-preserver of that class in which the buoyant property is supplied by suitably-arranged bunches of the dried stems or stalks of halms, rushes, reeds, and the like, but preferably of the tule-grass described in my Patent No. 282,651, dated August 7, 1883.

My invention consists in the novel formation and arrangement of the bunches and their connection to form a complete life-preserver without the use of any external covering sack or skin of canvas or other material, such as is usually employed.

The object of my invention is to provide a simple, effective, and economical life-preserver.

Referring to the accompanying drawings, Figure 1 is a perspective view of my life-preserver. Fig. 2 is a horizontal section of a portion of the same.

A is the life-preserver, made up of a number of bunches, B, of the dried stems or stalks of any suitable rush, reed, or halm of similar nature having buoyant properties. I have found that the best material for this purpose is what is known as "tule-grass," which is a large club rush or sedge of the order *Cyperaceæ*, and known scientifically as *Scirpus validus*. It grows in marshy places, and while found in several portions of the United States, is particularly abundant in California, where it reaches a great height and its stems attain considerable diameter. These stems, while being pithy, are quite tough, and do not become readily water-logged, and when dried are very light and buoyant. These properties are more particularly characteristic of the foot or lower portion of the stems, the upper portions being more like straw. The stems, when dried, I cut into equal lengths, preferably from the foot portions, and a number sufficient to form a bunch of suitable dimensions I lay together. I may then tie the ends of each bunch separately in some manner, as by a copper wire passed around and twisted tightly; but I prefer to do the tying of each bunch at the same time and by the same wires by which the bunches are united to form the life-preserver.

The wires C, which should be of copper to resist the action of the water, are passed outside of one bunch and inside the next, and so on, crossing each other or interlacing between the bunches. They are twisted, as shown, at each crossing, by which means they are tightened on the bunch and hold it together, even without the assistance of a separate wire.

The life-preserver, as a whole, should consist, as in ordinary cases, of two or more portions jointed in such manner as to render the whole flexible enough to pass around and conform itself approximately to the body. I have here shown it as composed of halves, which are separated at one end and united at the other by means of copper rings D, joining the wires C. I could of course divide it otherwise and join the divisions by rings in the same manner, if it should be deemed advisable to do so. The centers of the bunches should also be joined, and though this might be done by wires, as in the case of the ends, I prefer to use strips E of some fabric—such as canvas or strong duck. These strips pass in and out between the bunches and cross each other, as in the case of wires C. Their ends *e* are left loose, and form the straps by which the life-preserver is tied when in position.

To the strips E are secured the crossed shoulder-straps F, which pass upward between the bunches and under the wires C, which act as guides to carry them past the bunches.

By thus securing the bunches I am enabled to dispense with the usual canvas covering found on life-preservers. The bunches are as securely held together as if confined in a covering, and the preserver is that much lighter without diminishing its coefficient of displacement. The life-preserver can be made at less cost, and will be made as effective as required.

Having thus described my invention, what I claim as new, and desire to secure by Letters Patent, is—

1. A life-preserver constructed of a number of independent bunches, B, of the dried stalks or stems of tule-grass or other rushes, reeds, or halms of similar buoyant nature, said bunches being uninclosed or uncovered, and the interlacing wires C, by which the bunches are tied or woven together, substantially as herein described.

2. A life-preserver constructed of a number of independent bunches, B, of the dried stalks or stems of tule-grass or other rushes, reeds, or halms of similar buoyant nature, said bunches being uninclosed or uncovered, the interlacing wires C, by which the bunches are tied or woven together, and the rings D, by which the wires are jointed, substantially as herein described.

3. A life-preserver constructed of a number of independent bunches, B, of the dried stalks or stems of tule-grass or other rushes, reeds, or halms of similar buoyant nature, said bunches being uninclosed or uncovered, the interlacing wires C at and around each end, by which the bunches are tied or woven together, and the interlacing strips E of fabric tying and weaving the centers of the bunches together, substantially as herein described.

4. A life-preserver constructed of a number of independent bunches, B, of the dried stalks or stems of tule-grass or other rushes, reeds, or halms of similar buoyant nature, said bunches being uninclosed or uncovered, the interlacing wires C at and around each end, by which the bunches are tied or woven together, the interlacing strips E of fabric tying and weaving together their centers, and having loose ends e, forming the straps by which the preserver is adjusted to the person, substantially as herein described.

5. A life-preserver constructed of a number of independent bunches, B, of the dried stalks or stems of tule-grass or other rushes, reeds, or halms of similar buoyant nature, said bunches being uninclosed or uncovered, the interlacing wires C at and around each end, by which the bunches are tied or woven together, the interlacing strips E of fabric tying and weaving together their centers, and the shoulder-straps F, secured to said central strip, substantially as herein described.

6. The life-preserver A, consisting of the uncovered bunches B of tule-grass, (*Scirpus validus*,) the wires C, binding their ends together, and the fabric strips E, joining their centers, together with suitable tying and shoulder straps, substantially as herein described.

7. The life-preserver A, consisting of a number of uncovered bunches, B, of the lower or foot portion of the dried stalks or stems of the tule-grass, (*Scirpus validus*,) said bunches being tied or united together, and the whole having suitable tying and shoulder straps, substantially as herein described.

In witness whereof I have hereunto set my hand.

CONSTANT LEDUC.

Witnesses:
CHAS. DODGE,
J. H. BLOOD.